(12) United States Patent
Layne et al.

(10) Patent No.: US 10,589,938 B2
(45) Date of Patent: Mar. 17, 2020

(54) CONVEYING APPARATUS WITH MINIMALIST FRAME

(71) Applicant: SPAN TECH LLC, Glasgow, KY (US)

(72) Inventors: James L. Layne, Bowling Green, KY (US); Stephen C. Fye, Glasgow, KY (US); Scott Dayton Barbour, Glasgow, KY (US)

(73) Assignee: SPAN TECH LLC, Glasgow, KY (US)

( * ) Notice: Subject to any disclaimer, the term of this patent is extended or adjusted under 35 U.S.C. 154(b) by 0 days.

(21) Appl. No.: 16/052,145

(22) Filed: Aug. 1, 2018

(65) Prior Publication Data

US 2018/0339864 A1 Nov. 29, 2018

Related U.S. Application Data

(63) Continuation of application No. 15/412,799, filed on Jan. 23, 2017, now Pat. No. 10,053,297.

(60) Provisional application No. 62/281,516, filed on Jan. 21, 2016.

(51) Int. Cl.
*B65G 41/00* (2006.01)
*B65G 39/00* (2006.01)
*B65G 39/10* (2006.01)
*B65G 15/60* (2006.01)
*B65G 17/08* (2006.01)
*B65G 21/20* (2006.01)

(52) U.S. Cl.
CPC .......... *B65G 41/001* (2013.01); *B65G 17/08* (2013.01); *B65G 17/083* (2013.01); *B65G 21/20* (2013.01)

(58) Field of Classification Search
None
See application file for complete search history.

(56) References Cited

U.S. PATENT DOCUMENTS

| | | | | |
|---|---|---|---|---|
| 4,461,378 A * | 7/1984 | Roth | ...................... | B65G 17/02 198/370.04 |
| 5,775,480 A * | 7/1998 | Lapeyre | ............... | B65G 17/086 198/831 |
| 7,114,615 B1 * | 10/2006 | Karpy | .................... | B65G 21/20 198/860.1 |
| 7,246,697 B2 * | 7/2007 | Hosch | .................... | B65G 21/06 198/831 |
| 9,682,824 B2 * | 6/2017 | Peters | .................... | B65G 21/02 |

* cited by examiner

*Primary Examiner* — Kavel Singh
(74) *Attorney, Agent, or Firm* — King & Schickli, PLLC

(57) ABSTRACT

An apparatus includes a movable conveyor belt adapted for conveying articles supported by a conveying surface in a conveying direction, the conveyor belt including guide links. Guides in the form of at least two stationary rods elongated in the conveying direction engage the guide links of the conveyor belt during conveyance. The guides may form part of a conveyor frame including connectors spaced in the conveying direction connecting to at least one upper guide and at least one lower guide without projecting between them. An elongated support may be provided for supporting the connectors, and may include at least portion curved in the conveying direction and a vertical direction.

22 Claims, 6 Drawing Sheets

CONVEYING APPARATUS WITH MINIMALIST FRAME

This application claims the benefit of U.S. Provisional Patent Application Ser. No. 62/281,516, the disclosure of which is incorporated herein by reference.

TECHNICAL FIELD

This disclosure relates to the article conveying arts, and in particular, to a minimalist conveyor frame.

BACKGROUND

Conveyors are often comprised of rigid, bulky frames, which define a fixed, un-adjustable conveying path for objects being transported by a conveyor belt or chain. This fixed path means that altering a conveying path, such as adding or removing a curve, involves adding a new conveyor section with a predetermined curved or straight path. Thus, the adjustability is limited to the predetermined conveyor sections being installed.

This lack of adjustability may create problems when the goods being conveyed need to be unloaded from the conveyor. Typically, additional devices that tilt the conveyor or push the goods off of the conveyor are used. These devices add costs to a conveyor system and require additional maintenance and monitoring.

An additional problem that arises from these rigid, bulky frames is the size and weight involved when installing the conveyor or changing the conveying path. This can create difficulties when installing conveyors in small or crowded areas. Typical conveyor frames are also usually closed along the sides, which can make it difficult to clean the interior or conveyor system without significant disassembly or effort.

Accordingly, a need is identified for a relatively simple conveyor frame that may avoid the foregoing problems and perhaps others yet to be discovered.

SUMMARY

According to one aspect of the disclosure, an apparatus comprises a movable conveyor belt adapted for conveying articles supported by a conveying surface in a conveying direction, the conveyor belt including guide links. At least two stationary rods elongated in the conveying direction are provided for engaging the guide links of the conveyor belt during conveyance.

In one embodiment, the elongated rods include at least a portion extending spirally for causing the conveyor belt to tilt in a direction transverse to the conveying direction. A connector may also be provided for connecting the elongated rods, such as by way of mounting points. The connector may be adapted for connecting the elongated rods without projecting in a space between the guides.

The guide links may each include a receiver for receiving the elongated rod. At least two of the elongated rods may comprise upper rods for guiding a forward run of the conveyor belt, and further including at least two lower elongated rods for guiding a return run of the conveyor belt. The lower elongated rods may be twisted for causing the return run of the conveyor belt to tilt in a direction transverse to the conveying direction.

A connector may be provided for connecting with the upper rods and the lower rods. The connector in one embodiment does not project into a space between a corresponding pair of upper and lower rods. Each elongated rod may have a generally circular cross-section.

According to a further aspect of the disclosure, a frame for supporting a conveyor belt is provided. The frame comprises spaced upper and lower guides for guiding the conveyor belt along a forward run and a return run of the conveyor. Connectors spaced in the conveying direction are provided for connecting to at least one upper guide and at least one lower guide without projecting between the upper and lower guides.

In one embodiment, each connector includes a projection for connecting to an inner side of each guide. The projection may be connected to the inner side of the guide such that a majority of the guide is exposed for engaging the conveyor belt. The projection may be associated with the upper guide includes a surface for engaging the conveyor belt.

Each guide may be generally circular in cross-section. The guide may extend spirally in the conveying direction for causing the conveyor belt to tilt in a direction transverse to a conveying direction. Each connector may include a cut out for receiving a portion of the conveyor belt traversing along the guides.

A first connector may be rotated relative to a second connector. For instance, the first connector may be oriented with a longitudinal axis generally parallel to a horizontal plane and the second connector may be oriented with a longitudinal axis not parallel to the horizontal plane. A third connector may also be provided, and may be oriented with a longitudinal axis generally orthogonal to a horizontal plane.

According to a further aspect of the disclosure, a frame for supporting a conveyor belt adapted for conveying articles supported by a conveying surface in a conveying direction is provided. The frame comprises at least two laterally spaced guides for guiding the conveyor belt. A plurality of connectors for connecting the guides are provided, and a support elongated in the conveying direction is provided for supporting the plurality of connectors. The elongated support includes at least a portion curved in a vertical direction.

Each guide may include at least a portion extending spirally for causing the conveyor belt to tilt in a direction transverse to the conveying direction. Each connector may include an aperture for receiving the elongated support. Each guide may be a rod that is generally circular in cross-section.

BRIEF DESCRIPTION OF THE DRAWING FIGURES

The accompanying drawing figures incorporated herein and forming a part of the specification, illustrate several aspects of a conveying apparatus with a minimalist frame system and, together with the description, serve to explain certain principles thereof. In the drawing figures.

Reference will now be made in detail to the present preferred embodiments, examples of which are illustrated in the accompanying drawing figures.

DETAILED DESCRIPTION

Figure 1:
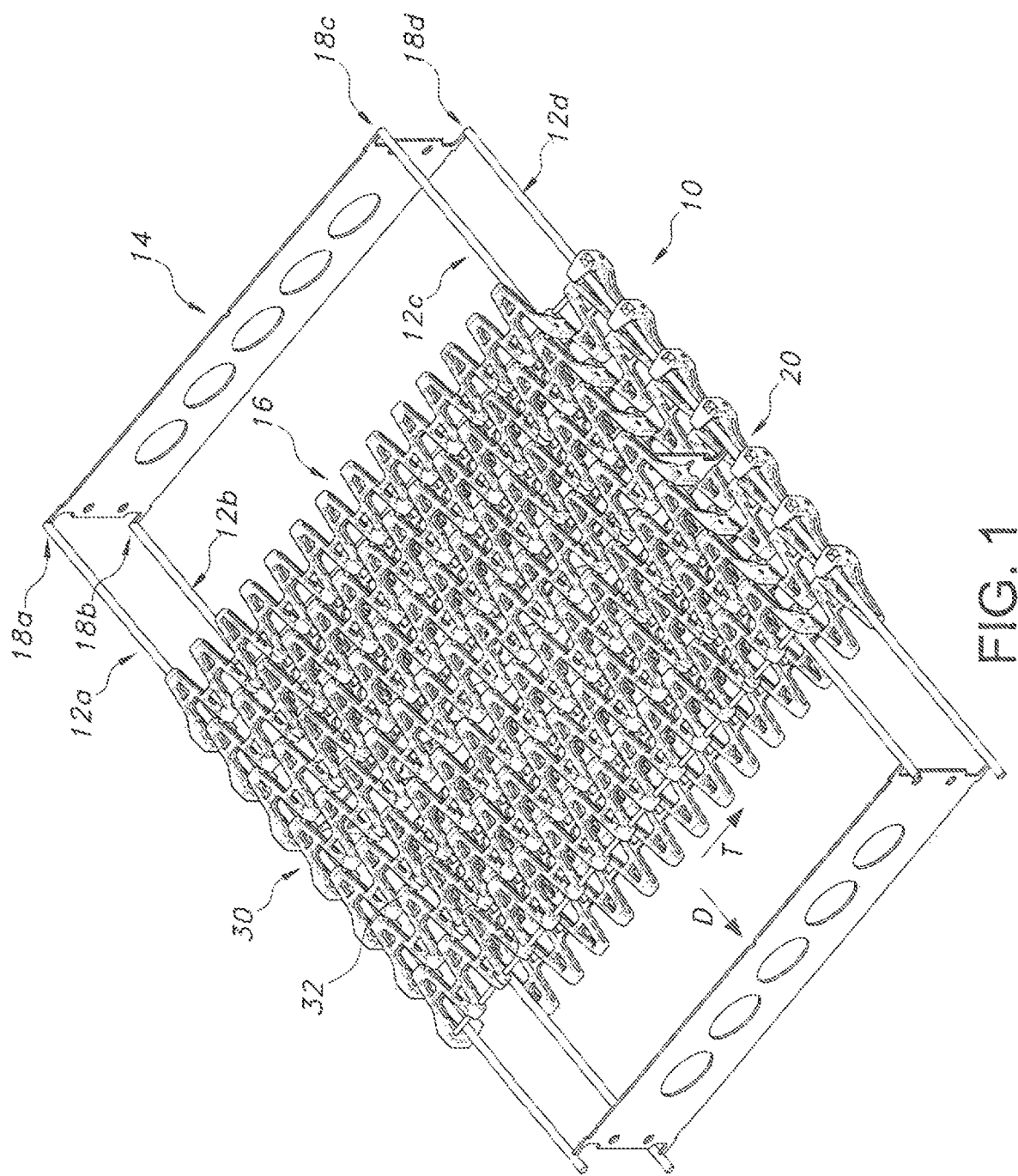
FIG. 1 is a perspective top view of one possible embodiment of a conveying apparatus with a minimalist frame.
Figure 2:
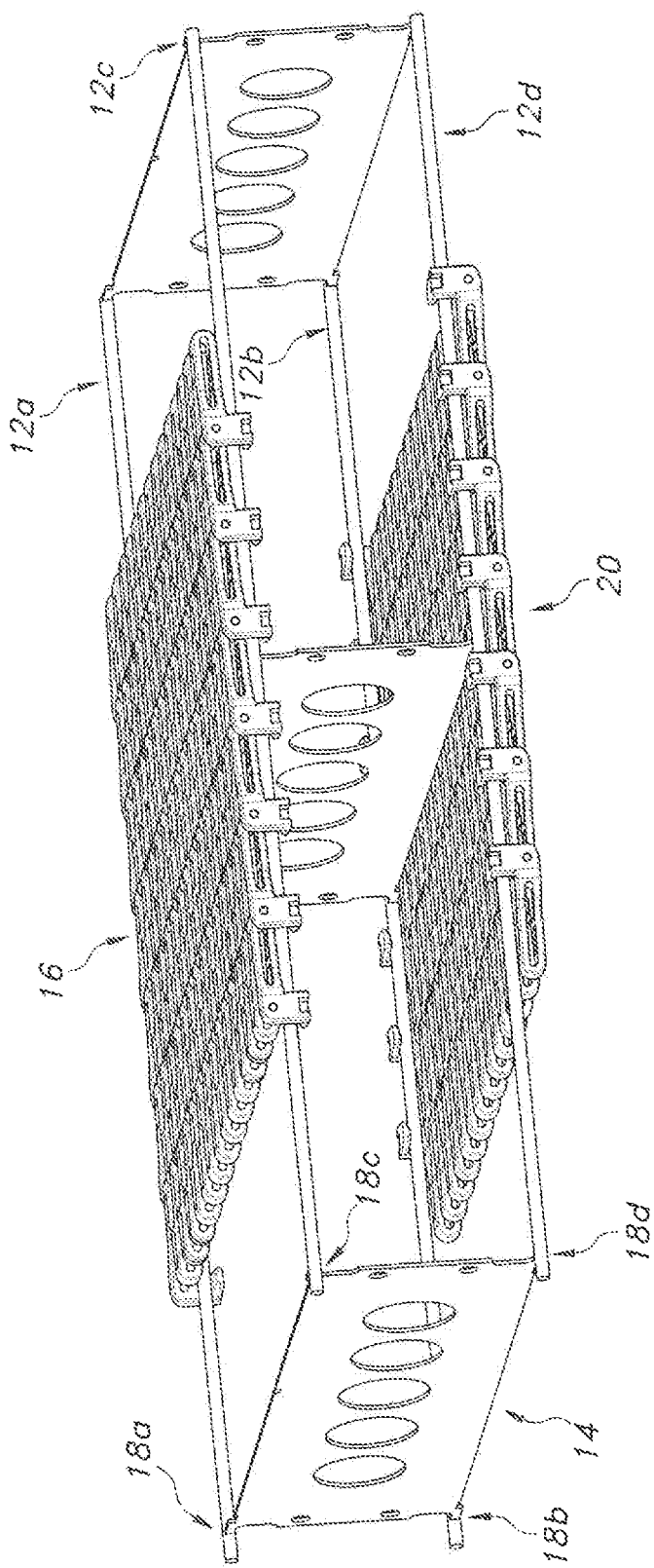
FIG. 2 is a perspective side view of the conveying apparatus.
Figure 3:
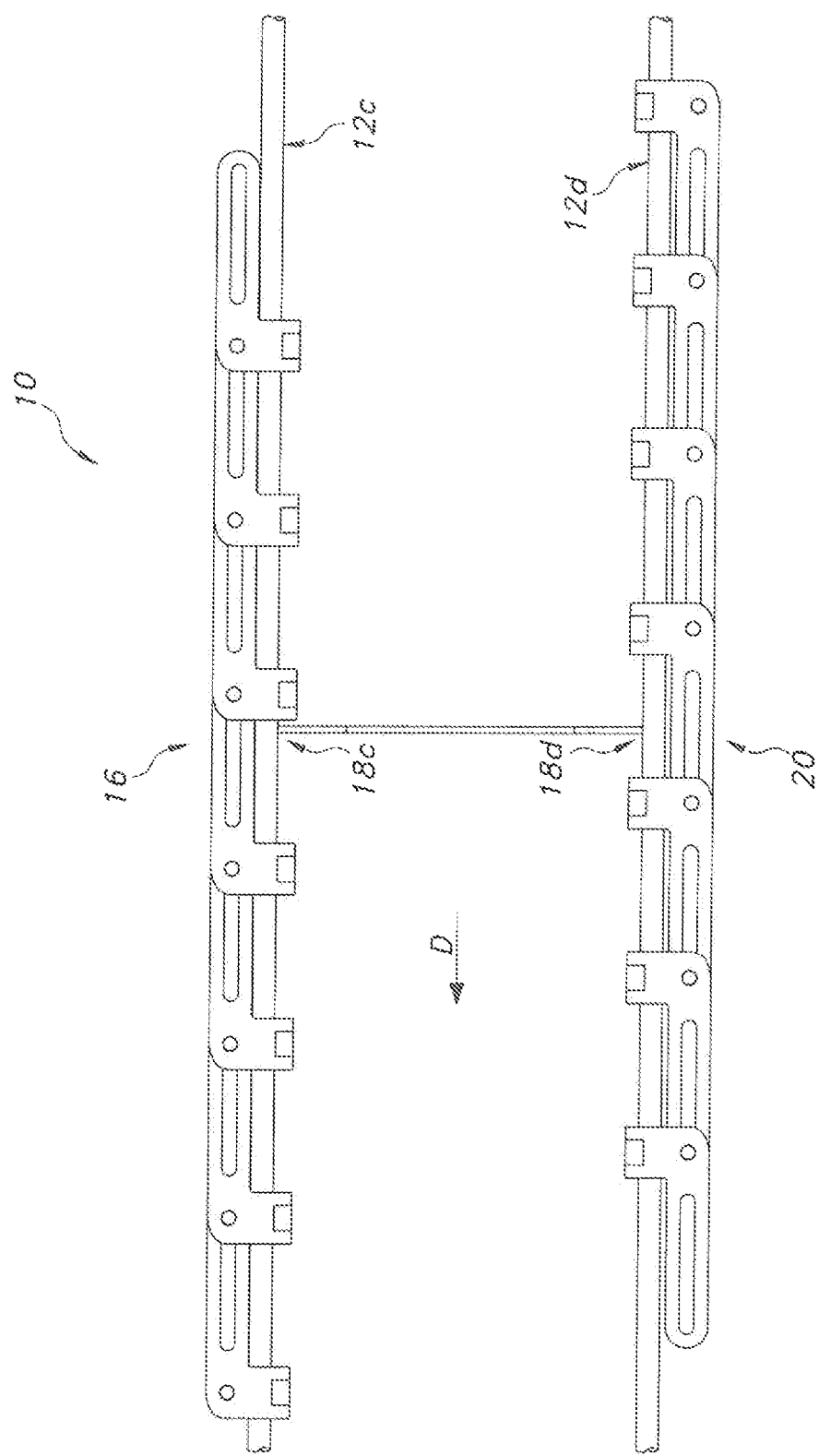
FIG. 3 is a side view of the conveying apparatus.
Figure 8:
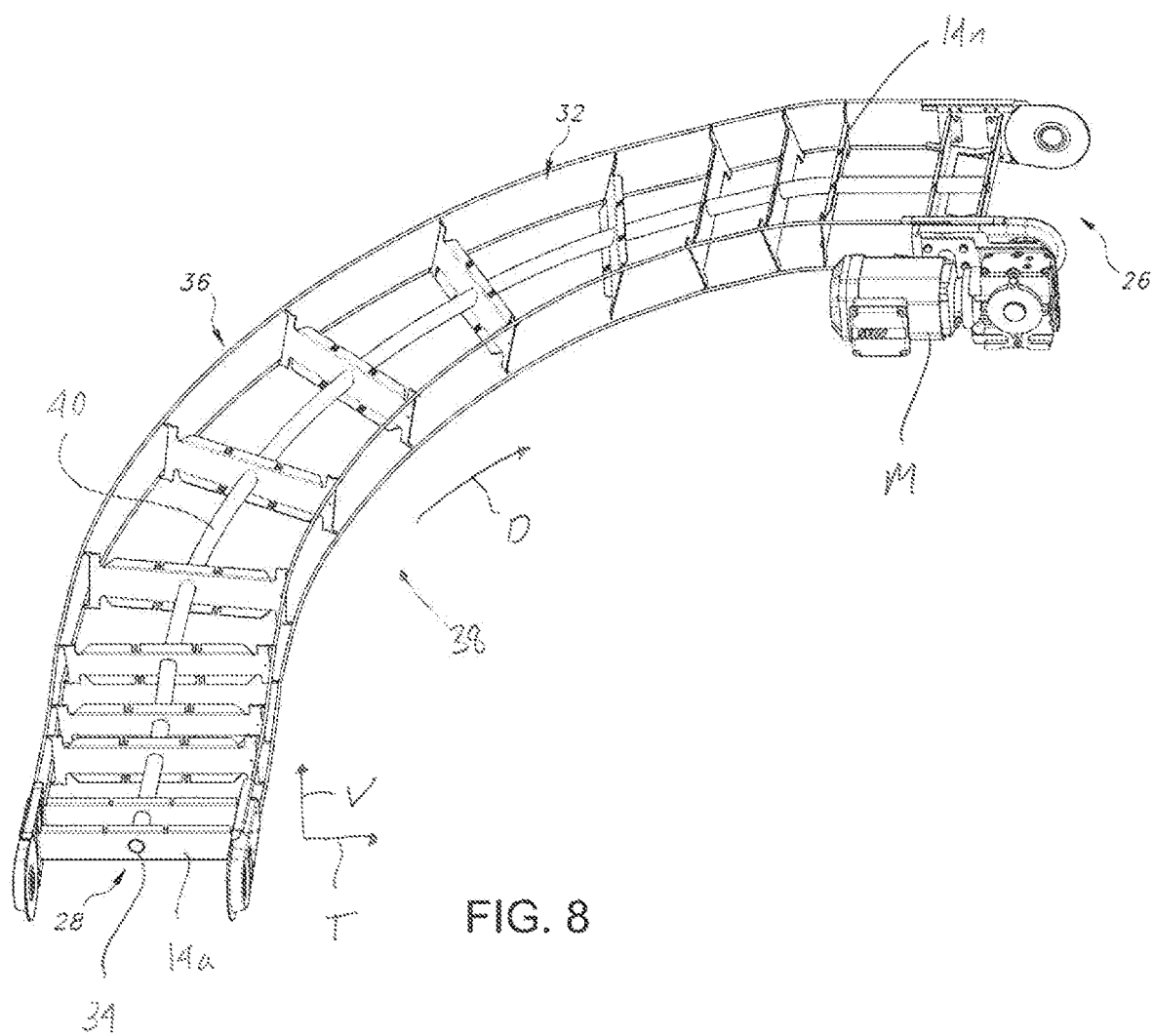
FIG. 8 is a perspective view of a conveying apparatus including a support in the form of a central journal curving in both the conveying direction and a transverse or vertical direction.

With reference to FIG. 1, a possible embodiment of a conveying apparatus 10 forming one aspect of the invention is illustrated. The apparatus 10 may comprise a plurality of elongated guides 12 for guiding a conveyor belt 30. The guidance may be provided along an endless path in a generally linear or straight conveying direction D (as contrasted with a curved conveying direction, as indicated in FIG. 8). The belt 30 may be of the endless belt or chain type, and may provide a continuous conveying surface 32 for articles being conveyed.

Although certainly not a requirement, the types of endless belt or chain conveyors manufactured and sold by Span Tech LLC under THE DESIGNER SYSTEM trademark, may be used (the details of which are found in U.S. Pat. Nos. 4,953,693 and 5,031,757 (which are incorporated herein by reference)). In such case, the belt or chain includes special side guide links with depending arms and inwardly directed tabs, which together form a receiver adapted for substantially surrounding and engaging the guides (see FIG. 4).

The guides 12 in one embodiment may comprise thin, generally round and smooth surfaced rods 12a-12d (which may be solid or partially hollow) for forming part of a conveyor frame 38 and maintained stationary for supporting and guiding the driven conveyor belt 30 as it traverses the endless path. The rods 12a-12d may be elongated in the conveying direction D (straight or curved, as it may be) and secured at a plurality of mounting points 18a-18d to one or more connectors 14, such as cross members, for establishing a path for guiding the conveyor belt or chain 30, such as by way of sliding engagement (for which a rod with circular cross-section is thus especially beneficial).

As can be appreciated, a generally parallel first or upper pair of rods 12a, 12c may guide a forward run 16 of the belt 30. Likewise, a generally parallel lower pair of rods 12b, 12d may guide a return run 20 of the belt 30. As shown in FIG. 8, the belt 30 may transition between the forward and return runs 16, 20 at the ends of the apparatus 10, thus forming an endless path of travel, and may be driven at one end by a drive, such as a motor M for rotating drive sprockets (not shown).

Figure 4:
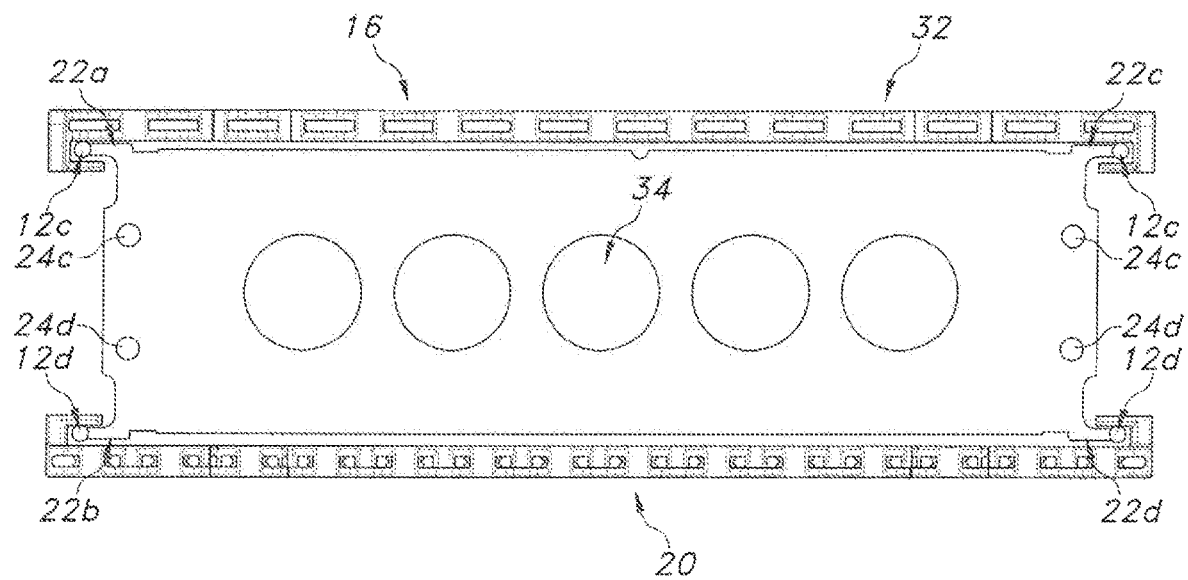
FIG. 4 is an end view of the conveying apparatus.

As can perhaps best be seen in FIG. 4, the connectors 14 may include transversely extending projections 22a-22d. Each projection 22a-22d forms a mounting point 18a-18d with each of the rods 12a-12d. This gives the connectors 14 a rotated H-shaped configuration in the illustrated embodiment, but the connectors may take other forms as well (e.g., an X-shape).

The projections 22a-22d may attach to an inner surface of the rods 12a-12d while maintaining clearance for the chain 30 to pass along the rods. Specifically, the projections 22a-22d are elongated in a direction T transverse to the conveying direction D, and connect directly to the rods 12a-12d, such as by welded connection. The connection may be such that the majority of the rod surface is exposed for engaging corresponding guide surfaces of the belt 30 (such as between the underside of the link surface, the inner surface of the depending arm, and the upper surface of the inwardly directed guide tab). At least three quarters of the rod surface may be exposed for engaging the conveyor belt 30, such that the top, outer side, and lower surfaces of the rods 12a-12d are fully able to engage the guide surfaces of the belt 30.

As can be understood with reference to FIG. 4, each connector 14 may also include a cut out 15 along a lateral side thereof, such as adjacent to each projection 22a-22d. These cut outs 15 are thus adapted for receiving a portion of the passing belt 30. It can be further appreciated from FIG. 4 that, at least along the upper or forward run 16, the projections 22a, 22c may include a surface for engaging and supporting an underside of the conveyor belt 30. Similarly, along a return run 20, the projections 22b, 22d may include a surface for engaging an inner surface of the belt 30, such as along the inwardly directed guide tabs (although it is preferred that the belt 30 engage only the rods 12a-12d in all cases so as to minimize frictional engagement and thus reduce the effort required to drive the conveyor belt 30 and the corresponding wear).

From the foregoing, it can be understood that this manner of connection creates a minimalist conveyor frame 38 in which the connectors 14 do not in any way project or extend into the space or gap (such as the vertical space; see FIG. 4), between the guides 12 and, in particular, rods 12a-12d. Thus, the space between the guides 12, such as upper and lower rods 12a, 12b; 12c, 12d remains open, thus allowing for cleaning fluids to easily reach parts that might otherwise be recessed. A significant savings in materials, and thus cost and weight, is also realized by avoiding the need for connectors that extend between the guides at all or a majority of points in the conveying direction.

To provide support for the conveyor belt 30 and frame 38 above the ground, each connector 14 may also include mounts 24a-24d. The mounts 24a-24d may receive fasteners for connecting to supports (not shown). Alternatively, the apparatus 10 may include a support (such as a tube or rod 40) elongated in the conveying direction D, as outlined further in the following description.

Sometimes it may be desirable to offload goods or articles conveyed on the conveying surface 32 of the belt 30 in a direction T transverse to the conveying direction D. This may be achieved without the influence of additional components or devices using the proposed conveyor apparatus 10 by configuring at least the upper rods 12a, 12c to allow the surface 32 to move from generally horizontal to a tilted orientation (note cross slope C, which may range anywhere from greater than zero to about ninety degrees relative to a horizontal plane, as indicated by reference character H). As can be appreciated, this titling would cause goods or articles being conveyed to slide along the conveying surface 32. This selective repositioning may be done for offloading articles or goods at a predetermined location, or for placing the articles along a corresponding article guide rail 36 for distribution at a known position to a downstream location (see, e.g., FIG. 8).

Figure 5:
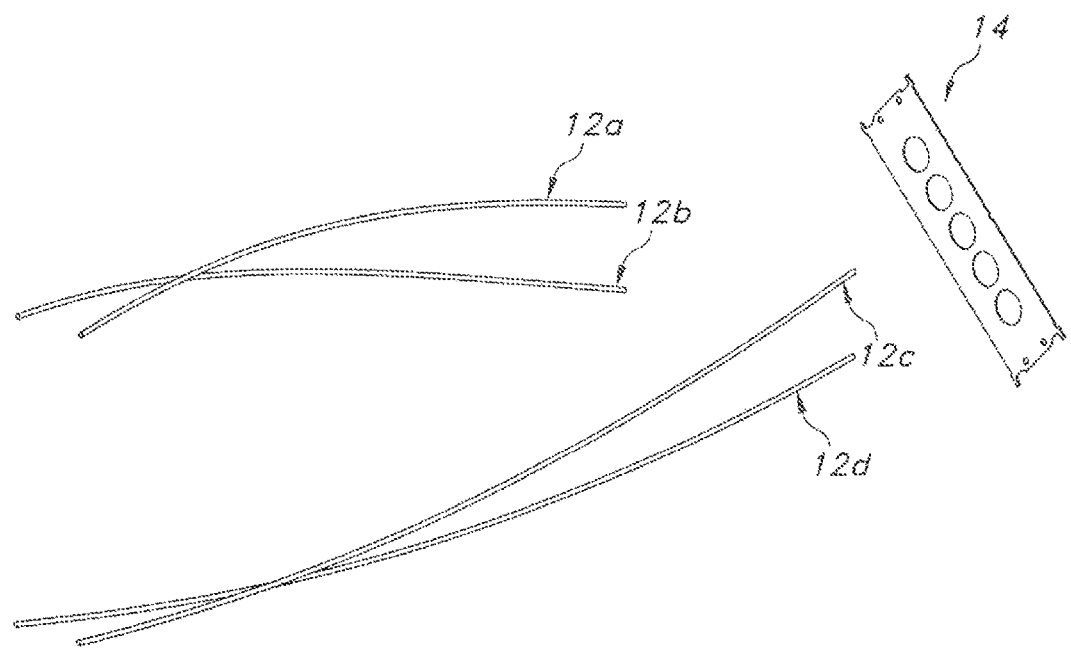
FIG. 5 is an exploded view of a conveyor frame forming part of the apparatus in one possible embodiment.

In one embodiment, the tilting of the conveying surface 32 may be achieved by making the guides 12 curve or extend spirally (or helically, since the spiral is three dimensional) in the conveying direction D, as shown in FIG. 5. More specifically, each rod 12a-12d is arranged so as to curve as it elongates in both a transverse direction T and a direction perpendicular to the transverse direction T and the conveying direction D, which direction may also be aligned with a vertical direction. The rods 12a-12d may thus appear to have an outwardly bowed configuration, as perhaps best understood with reference to FIG. 5. The rods 12a-12d may include both a horizontal portion and a spiral portion, or only one such portion (which may be then interconnected to form the guide 12).

When such rods 12a-12d serving as the guide 12 used as part of a conveyor apparatus 10, the connectors 14 are also reoriented accordingly, such that a first connector 14a may have an axis of elongation or longitudinal axis generally parallel to a horizontal plane, while a second connector 14b (downstream or upstream) has a longitudinal axis that is not generally parallel to a horizontal plane or otherwise tilted relative thereto. Likewise, a further connector 14c may similarly be provided with a longitudinal axis that is not generally parallel to a horizontal plane, and in fact may be orthogonal to this plane (and thus also both the conveying direction D and the transverse direction T).

One example of use of a conveying apparatus 10 constructed according to this disclosure is described with reference to FIG. 8, which illustrates the conveying direction D as being curved. As can be seen, the frame 38 is such that the conveying surface of the belt (not shown) would be horizontal at a first portion 26 and tilted or reoriented at a second portion 28, and thus creating a twisted conveying path. Goods being conveyed thus travel along the first portion 26 in the usual manner until they reach a transition point, where the rods 12a-12d, as well as the connectors 14 (or more), are oriented to create the desired cross slope C to the conveying surface 32 in a gradual manner. Consequently, the movement of the articles to the lower point for offloading is gradual as well.

As can be appreciated, the end transition of the conveyor belt 30 may also be reoriented to correspond with the inclination of the conveying surface, and may follow generally the opposite path in returning to the forward run (that is, first vertical, and then gradually returning to horizontal, in a direction opposite the conveying direction D). Alternatively, the frame may be arranged to return the belt 30 to a horizontal alignment prior to commencing the return run 20.

FIG. 8 further illustrates that two or more of the connectors 14a-14n may be connected by way of a common support. The support may comprise a central journal or rod 40 (which may comprise a hollow tube having a generally circular cross-section) extending in the conveying direction D, and passing through apertures 34 in each connector 14a-14n. To facilitate the desired twisting of the conveyor belt 30, the rod 40 may also curve in the conveying direction D, as well as in a transverse or vertical direction V.

Figure 6:
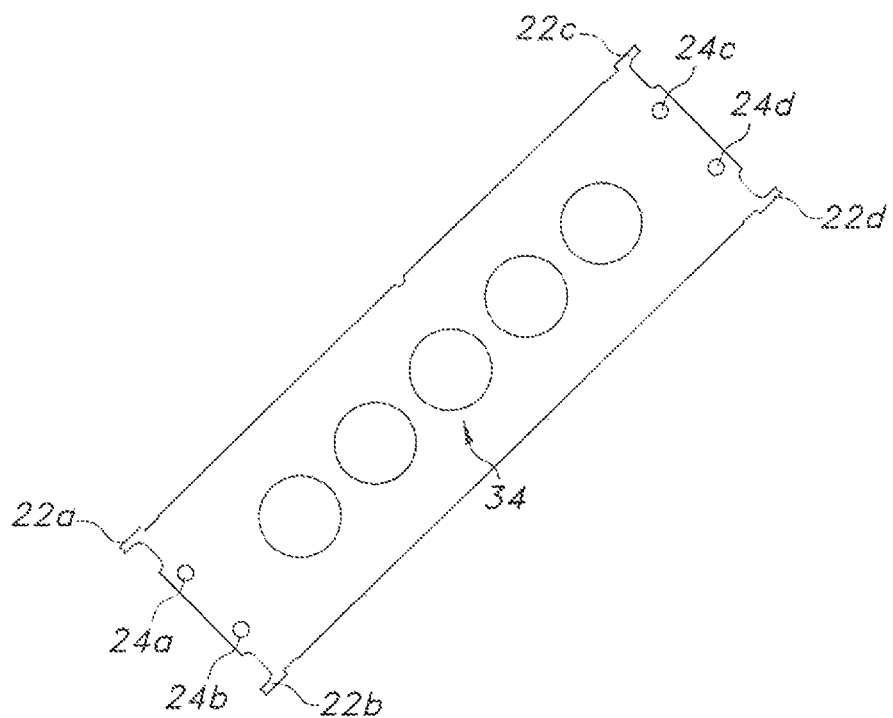
FIG. 6 is a front or rear view of a connector forming part of the conveying frame.
Figure 7:
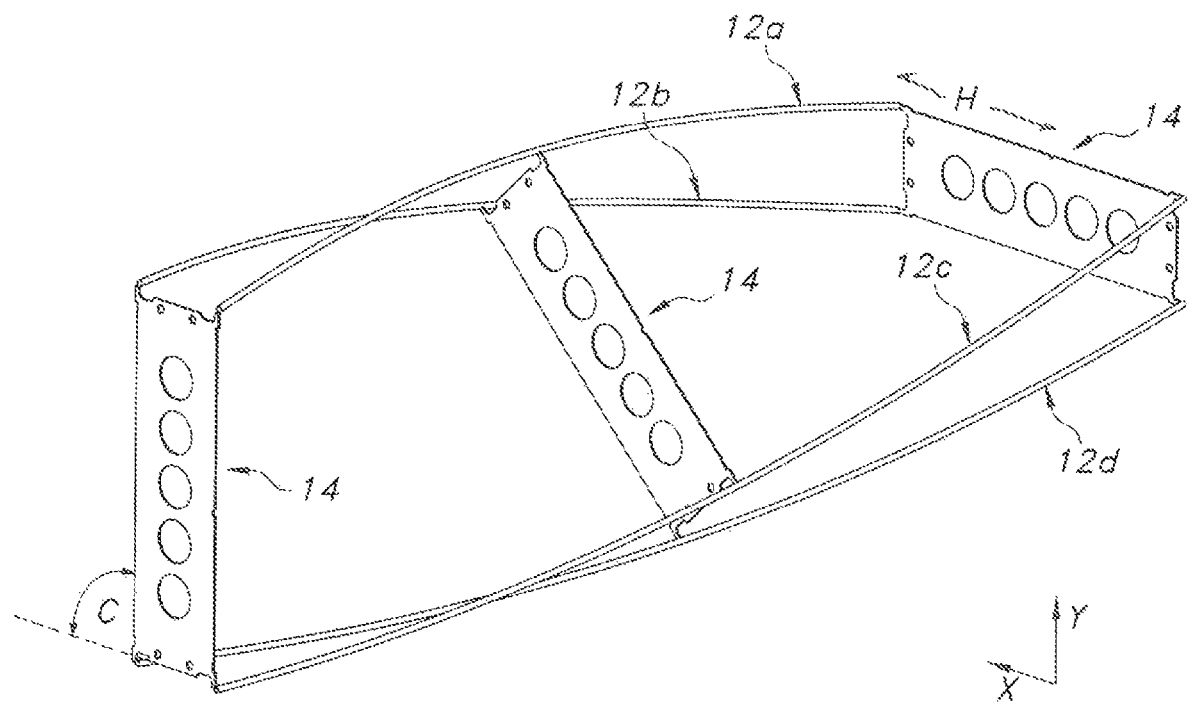
FIG. 7 is a perspective view of a helical conveying frame with spiral rods according to one aspect of the disclosure.

The rods 12a-12d and connector 14 may be formed of a durable material that is easy to clean, such as stainless steel or aluminum, and also can be welded to the connectors 14, which may also be formed of similar materials. However, any suitable material which provides the necessary strength and durability may be used. As can be seen in FIG. 6, the connectors 14 may each include plural openings or apertures 34, which reduce both weight and cost of the material used. The number of connectors 14 provided may vary depending on the particular application.

The foregoing descriptions of various embodiments provide illustration of the inventive concepts. The descriptions are not intended to be exhaustive or to limit the disclosed invention to the precise form disclosed. Modifications or variations are also possible in light of the above teachings. Any elements described herein as singular can be pluralized (i.e., anything described as "one" can be more than one), and plural elements can be used individually. Characteristics disclosed of a single variation of an element, the device, the methods, or combinations thereof can be used or apply for other variations, for example, dimensions, shapes, materials, or combinations thereof. Any species element of a genus element can have the characteristics or elements of any other species element of that genus. The term "comprising" is not meant to be limiting, and the term "generally" means that the feature may be similar in size or shape, but not exact (such as for example varying by less than 10%). The above-described configurations, elements or complete assemblies and methods and their elements for carrying out the invention, and variations of aspects of the invention can be combined and modified with each other in any combination.

The invention claimed is:

1. An apparatus, comprising:
a movable conveyor belt adapted for conveying articles supported by a conveying surface in a conveying direction, the conveyor belt including guide links; and
at least two elongated stationary rods elongated in the conveying direction for engaging the guide links of the conveyor belt during conveyance;
wherein the guide links each include a receiver for receiving the elongated rod.

2. The apparatus of claim 1, wherein the elongated rods include at least a portion extending spirally for causing the conveyor belt to tilt in a direction transverse to the conveying direction.

3. The apparatus of claim 1, further including a connector for connecting the elongated rods.

4. The apparatus of claim 3, wherein the connector includes mounting points for connecting to the elongated rods.

5. The apparatus of claim 3, wherein the connector is adapted for connecting the elongated rods without projecting in a space between the rods.

6. The apparatus of claim 1, wherein the at least two elongated rods comprise upper rods for guiding a forward run of the conveyor belt, and further including at least two lower elongated rods for guiding a return run of the conveyor belt.

7. The apparatus of claim 6, wherein the lower elongated rods are twisted for causing the return run of the conveyor belt to tilt in a direction transverse to the conveying direction.

8. The apparatus of claim 6, further including a connector for connecting with the upper rods and the lower rods.

9. The apparatus of claim 8, wherein the connector does not project into a space between a corresponding pair of upper and lower rods.

10. The apparatus of claim 1, wherein each elongated rod has a generally circular cross-section.

11. A frame for supporting a conveyor belt, comprising:
spaced upper and lower guides for guiding the conveyor belt along a forward run and a return run of the conveyor; and
connectors spaced in the conveying direction connecting to at least one upper guide and at least one lower guide;
wherein each guide extends spirally in the conveying direction for causing the conveyor belt to tilt in a direction transverse to a conveying direction.

12. The frame of claim 11, wherein each connector includes a projection for connecting to an inner side of each guide.

13. The frame of claim 12, wherein the projection is connected to the inner side of one of the at least one upper guide or the at least one lower guide such that a majority of said at least one upper guide or the at least one lower guide is exposed for engaging the conveyor belt.

14. The frame of claim 12, wherein the projection associated with the upper guide includes a surface for engaging the conveyor belt.

15. The frame of claim 11, wherein each guide is generally circular in cross-section.

16. The frame of claim 11, wherein each connector includes a cut out for receiving a portion of the conveyor belt traversing along the guides.

17. The frame of claim 11, wherein a first connector is rotated relative to a second connector.

18. The frame of claim 11, wherein a first connector is oriented with a longitudinal axis generally parallel to a horizontal plane and a second connector is oriented with a longitudinal axis not parallel to the horizontal plane.

19. The frame of claim 18, further including a third connector oriented with a longitudinal axis generally orthogonal to a horizontal plane.

20. A frame for supporting a conveyor belt adapted for conveying articles supported by a conveying surface in a conveying direction, comprising:
  at least two laterally spaced guides for guiding the conveyor belt;
  a plurality of connectors for connecting the guides; and
  a support elongated in the conveying direction for supporting the plurality of connectors, the elongated support including at least a portion curved in a vertical direction;
  wherein each guide includes at least a portion extending spirally for causing the conveyor belt to tilt in a direction transverse to the conveying direction.

21. The frame of claim 20, wherein each connector includes an aperture for receiving the elongated support.

22. The frame of claim 20, wherein each guide is generally circular in cross-section.

* * * * *